No. 646,709. Patented Apr. 3, 1900.
F. A. SEIBERLING.
PNEUMATIC TIRE.
(Application filed Jan. 15, 1900.)
(No Model.)
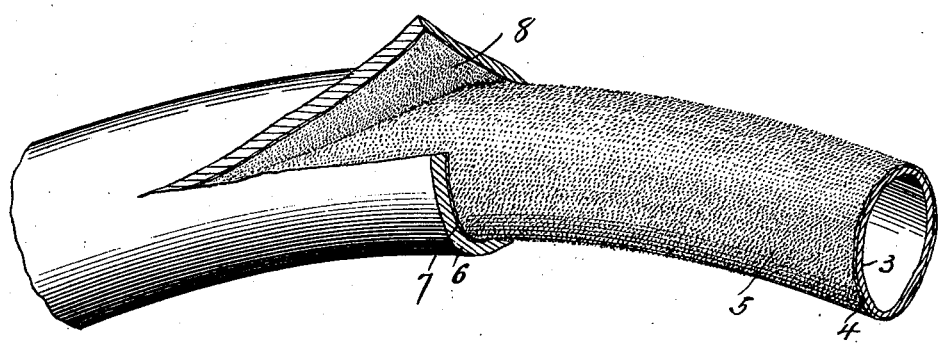
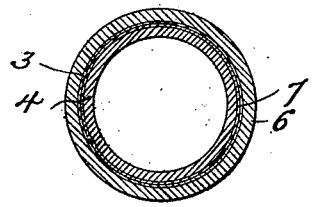

UNITED STATES PATENT OFFICE.

FRANK A. SEIBERLING, OF AKRON, OHIO.

PNEUMATIC TIRE.

SPECIFICATION forming part of Letters Patent No. 646,709, dated April 3, 1900.

Application filed January 15, 1900. Serial No. 1,456. (No model.)

*To all whom it may concern:*

Be it known that I, FRANK A. SEIBERLING, a citizen of the United States, residing at Akron, in the county of Summit and State of Ohio, have invented certain new and useful Improvements in Pneumatic Tires, of which the following is a specification.

My invention relates to pneumatic tires having an inner closed air-tube and an outer sheath or covering; and the object of my invention is to permit the construction of a tire of this kind in such a manner that it may be vulcanized as a whole without causing the contacting surfaces of the air-tube and the sheath or cover to unite or adhere.

My invention consists in such a construction and arrangement of parts that the air-tube and cover are prevented from uniting during vulcanization, and this I accomplish by constructing the air-tube of an inner layer of rubber and an outer layer of fabric adhering thereto and the outer sheath or cover of an outer layer of rubber and an inner adhering layer of fabric, the fabric of both the air-tube and the cover being napped on their contiguous surfaces in such a manner as to prevent their adhesion when the tire is vulcanized.

My invention is illustrated in the accompanying drawings, in which—

Figure 1 is a broken perspective view of a section of a tire, and Fig. 2 is a cross-sectional view thereof.

In said drawings, 3 represents the inner air-tube, which is composed of rubber, and 4 an adhering layer of fabric or friction-cloth. The external surface of this friction-cloth is napped or roughened, as shown at 5. The outer sheath or cover is composed of an external layer of rubber 6 and an interior layer of fabric or friction-cloth 7, which is also napped or roughened on its exposed surface, as shown at 8.

In forming a tire according to my invention the inner air-tube is first formed upon the rod or mandrel by applying the layer of rubber and then the layer of friction-cloth napped upon its exterior. Thereafter the sheath is built up by applying first the layer of friction-cloth napped upon its inner side and thereafter applying the outer covering of rubber. The whole may then be vulcanized at a single operation, the ends of the tubes being previously joined by telescoping or otherwise. During such process of vulcanization the napped surfaces will prevent the adhesion or uniting of the inner main tube and the outer sheath or covering, thus providing a tire having the same convenience of repair or renewal as a double-tube tire and of equal simplicity and economy of construction as a single-tube tire. In fact the inner air-tube of my improved tire is better than the usual air-tube of the double-tube tire because it is composed of a strong layer of fabric and of rubber which is made endless and the joints made to disappear by the process of vulcanization. When it becomes necessary to apply a new sheath or cover or a new inner air-tube, as the case may be, it will be necessary, of course, to sever the outer sheath or cover to renew it or to permit access to the inner air-tube; but in either case the whole of the tire need not be discarded where the injury or damage has been done to one member only of the tire, The napped surfaces not only prevent uniting during vulcanization, but they further prevent any creeping or longitudinal movement of either of the tubes with reference to the other.

I claim—

1. A pneumatic tire comprising in combination an inner air-tube and an outer sheath or covering, said tube and said sheath having their contiguous surfaces napped to prevent cohesion during the process of vulcanization, substantially as described.

2. A pneumatic tire comprising in combination an inner air-tube composed of a layer of rubber and an outer layer of fabric napped on its exterior, and an outer sheath or cover composed of an external layer of rubber and an internal layer of fabric also napped on its interior, substantially as described.

FRANK A. SEIBERLING.

Witnesses:
M. B. COLE,
PERCY B. HILLS.